(12) United States Patent
Butler et al.

(10) Patent No.: US 7,847,029 B2
(45) Date of Patent: Dec. 7, 2010

(54) ELASTOMERIC RESIN COMPOSITIONS WITH IMPROVED RESISTANCE TO DRAW RESONANCE

(75) Inventors: Thomas I. Butler, Lake Jackson, TX (US); Andy C. Chang, Houston, TX (US); Jozef J. I. Van Dun, Zandhoven (BE); Ronald J. Weeks, Lake Jackson, TX (US); Jeffrey D. Weinhold, Lake Jackson, TX (US); Rajen M. Patel, Lake Jackson, TX (US); David T. Gillespie, Pearland, TX (US)

(73) Assignee: Dow Global Technologies, Inc., Midland, MI (US)

( * ) Notice: Subject to any disclaimer, the term of this patent is extended or adjusted under 35 U.S.C. 154(b) by 372 days.

(21) Appl. No.: 11/722,526

(22) PCT Filed: Dec. 23, 2005

(86) PCT No.: PCT/US2005/047172

§ 371 (c)(1),
(2), (4) Date: Jun. 22, 2007

(87) PCT Pub. No.: WO2006/073962

PCT Pub. Date: Jul. 13, 2006

(65) Prior Publication Data

US 2008/0293890 A1 Nov. 27, 2008

Related U.S. Application Data

(60) Provisional application No. 60/641,093, filed on Jan. 3, 2005.

(51) Int. Cl.
C08L 23/00 (2006.01)
C08L 23/04 (2006.01)
C08F 8/00 (2006.01)
C08F 110/02 (2006.01)

(52) U.S. Cl. .................. 525/240; 525/191; 526/352; 526/352.2; 526/348

(58) Field of Classification Search ............. 525/240, 525/191; 526/352.2, 352, 348
See application file for complete search history.

(56) References Cited

U.S. PATENT DOCUMENTS

| | | | |
|---|---|---|---|
| 4,116,892 A | 9/1978 | Schwarz | |
| 4,339,507 A | 7/1982 | Kurtz et al. | |
| 4,486,377 A | 12/1984 | Lucchesi et al. | |
| 4,486,552 A | 12/1984 | Niemann | |
| 4,599,392 A | 7/1986 | McKinney et al. | |
| 4,608,221 A | 8/1986 | Kurtz et al. | |
| 4,780,264 A | 10/1988 | Dohrer et al. | |
| 5,017,429 A * | 5/1991 | Akao | 428/349 |
| 5,156,793 A | 10/1992 | Buell et al. | |
| 5,376,439 A | 12/1994 | Hodgson et al. | |
| 5,395,471 A | 3/1995 | Obijeski et al. | |
| 5,582,923 A | 12/1996 | Kale et al. | |
| 5,656,696 A | 8/1997 | Yamamoto et al. | |
| 5,663,236 A | 9/1997 | Takahashi et al. | |
| 5,674,342 A | 10/1997 | Obijeski et al. | |
| 5,674,945 A | 10/1997 | Takahashi et al. | |
| 5,741,861 A | 4/1998 | Yamamoto et al. | |
| 5,773,155 A | 6/1998 | Kale et al. | |
| 5,863,665 A * | 1/1999 | Kale et al. | 428/523 |
| 6,359,073 B1 | 3/2002 | Babb et al. | |
| 6,545,094 B2 * | 4/2003 | Oswald et al. | 525/191 |
| 6,617,016 B2 | 9/2003 | Zhang et al. | |
| 6,723,793 B2 * | 4/2004 | Oswald et al. | 525/191 |
| 7,101,623 B2 * | 9/2006 | Jordan et al. | 428/370 |
| 2004/0087750 A1 | 5/2004 | Agarwal et al. | |
| 2006/0281866 A1 * | 12/2006 | Oswald et al. | 525/240 |
| 2008/0234435 A1 * | 9/2008 | Chang et al. | 525/240 |

FOREIGN PATENT DOCUMENTS

| | | |
|---|---|---|
| EP | 0 600 482 B1 | 4/1998 |
| EP | 0 879 849 A2 | 11/1998 |
| EP | 0 706 448 B1 | 7/1999 |
| EP | 0 601 495 B1 | 4/2002 |
| JP | 10-77374 | 3/1998 |
| WO | WO-90/03464 | 4/1990 |
| WO | W-95/25141 | 9/1995 |
| WO | WO-00/78858 A2 | 12/2000 |
| WO | WO-03/082971 A2 | 10/2003 |
| WO | WO-2005/023912 A2 | 3/2005 |
| WO | WO-2005/090425 A1 | 9/2005 |
| WO | WO-2005/090426 A1 | 9/2005 |
| WO | WO-2005/090427 A2 | 9/2005 |
| WO | WO 2005/090464 A1 | 9/2005 |

OTHER PUBLICATIONS

Silagy, D., et al., Stationary and Stability Analysis of the Film Casting Process, Journal of Non-Wewtonian Fluid Mechanics, 1998, pp. 563-583, vol. 79.
Denn, M. et al., Instabilities in Polymer Processing, AICHE Journal, 1976, pp. 209-236, vol. 22 No. 2.
Anturkar, N. et al., Draw Resonance in Film Casting of Viscoelastic Fluids: A Linear Stability Analysis, Journal of Non-Newtonian Fluid Mechanics, 1988, pp. 287-307, vol. 28, Elsevier Science.
Pis-Lopez, M. et al., Multilayer Film Casting of Modified Giesekus Fluids Part 1 Steady-State Analysis, Journal of Non-Newtonian Fluid Mechanics, 1996, pp. 71-93, vol. 66, Elsevier Science.

(Continued)

*Primary Examiner*—Vasu Jagannathan
*Assistant Examiner*—Irina Krylova

(57) ABSTRACT

This invention relates to polyolefin compositions. In particular, the invention pertains to elastic polymer compositions that can be more easily processed on cast film lines, extrusion lamination or coating lines due to improved resistance to draw resonance. The compositions of the present invention comprise an elastomeric polyolefin resin and a high pressure low density type resin. The preferred compositions of the present invention comprise from 88 to 99 percent elastomer or plastomer and from 1 to 12 percent by weight of a high pressure low density type resin.

10 Claims, 4 Drawing Sheets

OTHER PUBLICATIONS

Smith, S., Numerical Simulation of Film Casting Using an Updated Lagrangian Finite Element Algorithm, Polymer Engineering and Science, 2003, pp. 1105-1122, vol. 43 No. 5.

Williams, T. et al., The Construction of a Polyethylene Calibration Curve for Gel Permeation Chromatography Using Polystyrene Fractions, Journal of Polymer Science, Polymer Letters Edition, 1968, pp. 621-624, vol. 6.

Zimm, B., Apparatus and Methods for Measurement and Interpretation of the Angular Variation of Light Scattering; Preliminary Results on Polystyrene Solutions, The Journal of Chemical Physics, 1948, pp. 1099-1116, vol. 16 No. 12.

Kratochvil, P., Fundamental Light-Scattering Methods, Classical Light Scattering from Polymer Solutions, 1987, pp. 113-144, Elsevier, New York.

Bortner, Michael J., et al., Dependence of Draw Resonance on Extensional Rheological Properties of LLDPE, Annual Technical Conference-Society of Plastics Engineers, 2000, pp. 1005-1009, vol. 1.

Mourey, Thomas H., et al., A Strategy for Interpreting Multidetector Size-Exclusion Chromatography Data I, Chromatography of Polymers, 1993, pp. 180-198, Chpt. 12.

Balke, Stephen T., et al., A Strategy for Interpreting Multidetector Size-Exclusion Chromatography Data II, 1993, pp. 199-219, chpt. 13.

International Search Report PCT/US2005/047172.

* cited by examiner

ELASTOMERIC RESIN COMPOSITIONS WITH IMPROVED RESISTANCE TO DRAW RESONANCE

This application is a non-provisional 371 national phase patent application of International Patent Application No. PCT/US2005/047172, filed on Dec. 23, 2005, entitled "ELASTOMERIC RESIN COMPOSITIONS WITH IMPROVED RESISTANCE TO DRAW RESONANCE," which claims priority from the U.S. Provisional Patent Application No. 60/641,093, filed on Jan. 3, 2005, entitled "ELASTOMERIC RESIN COMPOSITIONS WITH IMPROVED RESISTANCE TO DRAW RESONANCE," the teachings of which are incorporated by reference herein, as if reproduced in full hereinbelow.

This invention relates to polyolefin compositions. In particular, the invention pertains to elastic polymer compositions that can be more easily processed on cast film lines, extrusion lamination or coating lines due to improved resistance to draw resonance. The compositions of the present invention comprise an elastomeric polyolefin resin and a high pressure low density type resin. The preferred compositions of the present invention comprise from 88 to 99 percent elastomer or plastomer and from 1 to 12 percent by weight of a high pressure low density type resin.

Elastic films made from elastomeric polymers have found use in laminates with nonwoven fabrics as a way to impart elasticity to the nonwoven laminates. Such elastic nonwoven laminate materials have found use in the hygiene and medical market particularly in such applications as elastic diaper tabs, side panels of training pants, leg gathers, feminine hygiene articles, swim pants, incontinent wear, veterinary products, bandages, items of health care such as surgeon's gowns, surgical drapes, sterilization wrap, wipes, and the like. These materials may also find use in other nonwoven applications including but are not limited to filters (gas and liquid), automotive and marine protective covers, home furnishing such as bedding, carpet underpaddings, wall coverings, floor coverings, window shades, scrims etc. These elastic films can be incorporated into laminate designs such as those described in WO9003464A2, U.S. Pat. No. 4,116,892, U.S. Pat. No. 5,156,793.

Such elastic films are often prepared using cast film processes. In a typical cast film process the molten polymer is extruded through a die and then the molten film is drawn to the nip/chill rolls where it is rapidly cooled on the chill roll. Particularly as the speed of the production increases, a phenomenon known as draw resonance can occur under particular extrusion conditions especially when a nip is used. Draw resonance is the name given to periodic fluctuations in the thickness of the film in the machine direction (MD) which corresponds to periodic variations in the film width in the cross direction (CD). Draw resonance results in film instability which can restrict the productivity of commercial processes. Draw resonance is known to be a particular problem for polyolefin elastomers, particularly linear polyolefins. Accordingly, it is a goal to reduce or eliminate draw resonance in the production of films, particularly in the production of elastic films. This phenomenon has been described previously in the scientific literature. The following are some examples:

Silagy, D, J. *Non-Newtonian Fluid Mech.*, "Stationary and Stability Analysis of the Film Casting Process", page 563-583% vol. 79 (1998).

Silagy, D., "A Theoretical & Experimental Analysis of Line Speed Limitations in the Film Casting of Polyethylene", *6th European TAPPI Seminar on Polymers, Films, and Coatings*, Copenhagen, Jun. 8-9, 1999.

Denn, M, "Instabilities in Polymer Processing", *AICHE J.*, (22), No. 2, p 209-236, (March, 1976).

Anturkar, N., "Draw Resonance Film Casting of Viscoelastic Fluids: a Linear Stability Analysis", *J. of Non-Newtonian Fluid Mech.*, 28, p 287-307, (1998).

Pis-Lopez, M., Multilayer Film Casting of Modified Giesekus Fluids Part 1. Steady State analysis", *J. Non-Newtonian Fluid Mech.*, 66 p 71-93, (1996).

Bortner, M., "Dependence of Draw Resonance on Extensional Rheological Properties of LLDPE", *SPE 200ANTEC*

Smith, Spencer, "Numerical Simulation of Film Casting Using an Updated Lagrangian Finite Element Algorithm", *Polymer Engineering and Science*, May 2003, Vol. 43, No. 5, page 1105.

It has been discovered that when using polyolefin elastomers or plastomers in an extrusion lamination/coating application, the addition of a minor amount of a material with high levels of long chain branching, reduces the occurrence and/or severity of draw resonance. This enables higher productions rates. The preferred branched material will have a broad molecular weight distribution and sufficiently high melt strength. It is known however that the addition of such material negatively affects the elastic properties of the films or coatings. Surprisingly, however, it has been discovered that over certain optimal compositional ranges, the draw resonance is improved without the concurrent significant degradation in elastic performance.

Accordingly, one aspect of the invention is a composition of matter suitable for use in extrusion coating and/or extrusion lamination applications comprising:

a. from 85 to 99 percent by weight of the composition of a polyolefin based plastomer and/or elastomer; and b. from 1 to 12 percent by weight of the composition of a high pressure low density type resin.

In a particular aspect of the present invention, at least one ethylene-based elastomer is used. The ethylene content comprises the majority of the monomers by weight with the remainder comprising one other comonomer with $C_3$-$C_{22}$. The preferred polymer has a density of 0.855-0.885 g/cm³ (ASTM D792) and has a MI less than about 20 g/10 min (ASTM D1238 for polyethylenes). In this aspect, it may be advantageous to use an ethylene containing highly branched polymer for the second component. It should be understood that more than one ethylene based elastomer may be used.

In another aspect of the present invention, a propylene-based elastomer is used. The preferred polymer comprises at most 89 mol percent propylene with the remainder comprised of at least one other monomer type and has a MFR less than about 25 g/10 min (ASTM D1238 for polypropylenes). In one case, the copolymer is propylene-ethylene. Some polymers fitting this description include VERSIFY™ plastomers and elastomers from The Dow Chemical Company and VISTAMAXX™ polymers from the Exxon-Mobil Corporation. When using a propylene based elastomer, it may be advantageous to use a propylene containing highly branched polymer for the second component. Also, more than one propylene based elastomer may be used.

Another aspect of the present invention is a method to improve the extrusion coating and/or extrusion lamination of polyolefin elastomeric or plastomeric materials comprising adding up to 12 percent by weight of a high pressure low density type resin as the second component. Also, more than one second component may be used.

Elastic laminates and coatings made from the compositions of the present invention are another aspect of the present invention.

BRIEF DESCRIPTION OF THE DRAWINGS

FIG. 5 is a chromatogram from an on-line light scattering detector of an NBS 1476 high pressure low density polyethylene standard

DESCRIPTION OF THE PREFERRED EMBODIMENTS

Figure 1:
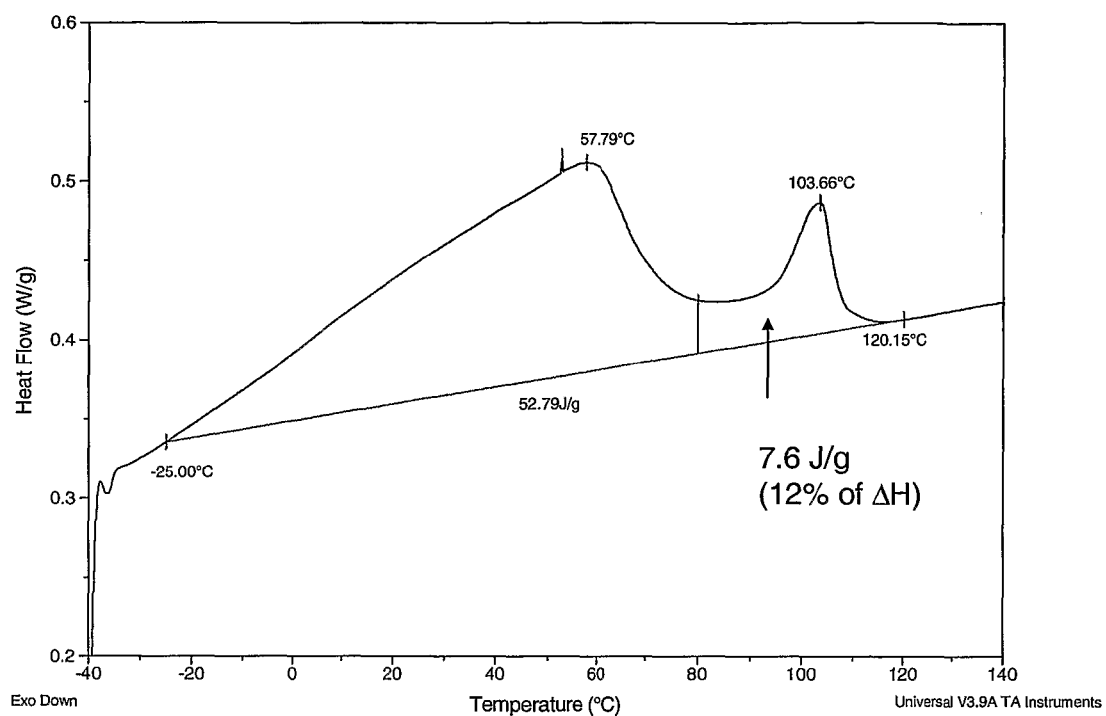
FIG. 1 is a DSC $2^{nd}$ heating thermogram and corresponding partial area.
Figure 2:
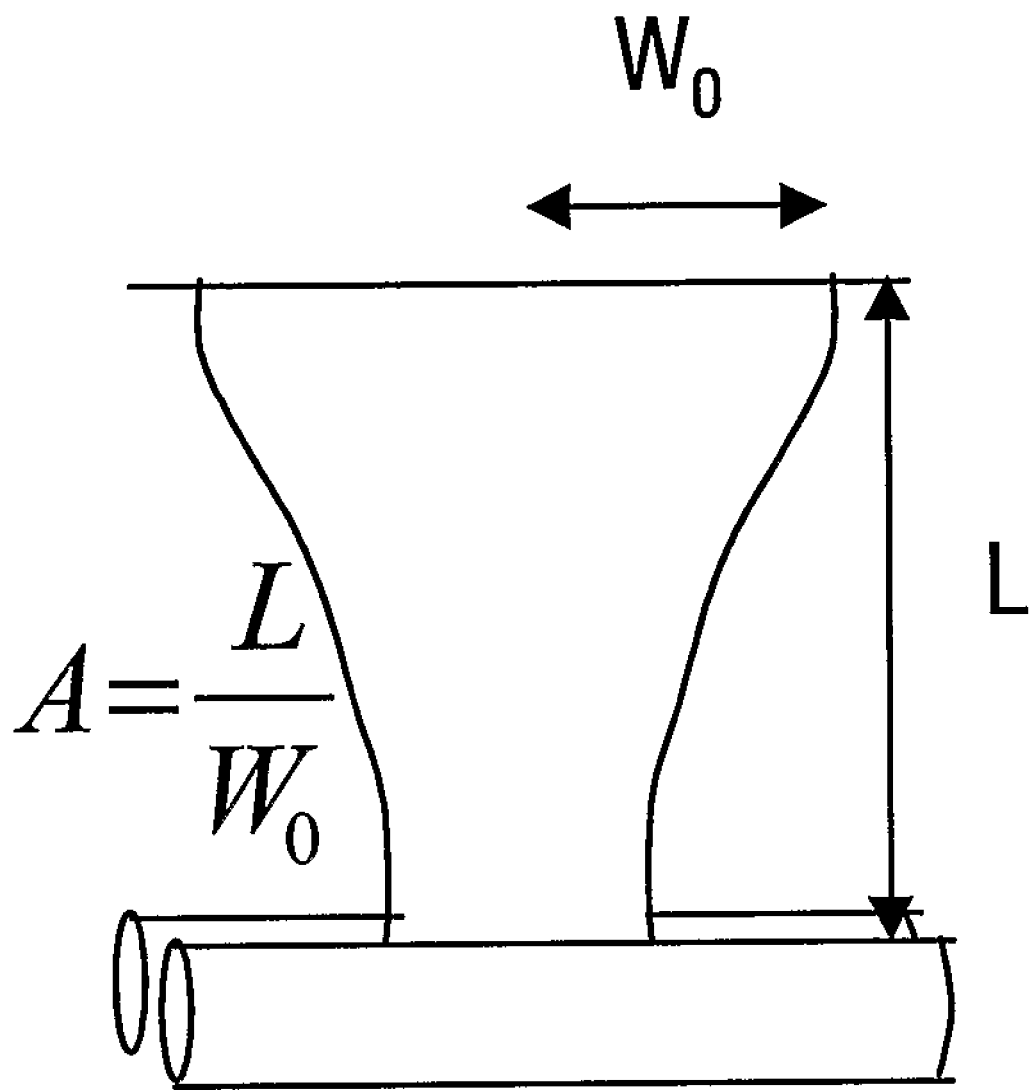
FIG. 2 is a schematic illustration of a typical film extrusion process with a nip roll.

The following terms shall have the given meaning for the purposes of this invention:

For purposes of this invention, a film is considered to be "elastic" if it has a permanent set of less than 40 percent as determined according to the following procedure: the samples is loaded into a Sintech mechanical testing device fitted with pneumatically activated line-contact grips with an initial separation of 4 inches. Then, the sample is stretched to 80 percent strain at 500 mm/min and returned to 0 percent strain at the same speed. The strain at 10 g load upon retraction was taken as the permanent set.

"Linear" means a polymer having a CDF less than about 0.02.

"Density" is tested in accordance with ASTM D792.

"Melt Index ($I_2$)" is determined according to ASTM D1238 using a weight of 2.16 kg at 190° C. for polymers comprising ethylene as the major component in the polymer.

"Melt Flow Rate (MFR)" is determined for according to ASTM D1238 using a weight of 2.16 kg at 230° C. for polymers comprising propylene as the major component in the polymer.

"Molecular weight distribution" or MWD is measured by conventional GPC per the procedure described by Williams, T.; Ward, I. M. *Journal of polymer Science, Polymer Letters Edition* (1968), 6(9), 621-624. Coefficient B is 1. Coefficient A is 0.4316.

With recent advances in technology, new lower density ethylene-based and propylene-based polymers have become available. Some classification schemes divide these materials into subgroups of "elastomers" and "plastomers." As many of these polymers are linear, they are ideally suited to be used in this invention, however they should exhibit elastic properties as defined earlier.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term high pressure low density type resin is defined to mean that the polymer is partly or entirely homopolymerized or copolymerized in autoclave or tubular reactors at pressures above 14,500 psi (100 MPa) with the use of free-radical initiators, such as peroxides (see for example, U.S. Pat. No. 4,599,392, herein incorporated by reference) and includes "LDPE" which may also be referred to as "high pressure ethylene polymer" or "highly branched polyethylene". The CDF of these materials is greater than about 0.02.

The term "high pressure low density type resin" also includes branched polypropylene materials (both homopolymer and copolymer). For the purposes of the present invention, "branched polypropylene materials" means the type of branched polypropylene materials disclosed in WO2003/082971, hereby incorporated by reference in its entirety.

Description of the Composition

The composition of matter of the present invention comprises at least two components. The first component is a polyolefin based plastomer and/or elastomer. Polyolefin based elastomers and plastomers/polymers include copolymers of ethylene with at least one other alpha olefin ($C_3$-$C_{22}$), as well as copolymers of propylene with at least one other alpha olefin ($C_2$, $C_4$-$C_{22}$). Preferred polyethylene based materials for the first component include linear and substantially linear polyethylene/alpha olefin copolymers. Propylene/ethylene polymeric materials can also be used where the ethylene content is from 9 to 15 percent by weight. If the first component is an ethylene based polymer, it can be characterized as having a density of less than about 0.885 g/cm$^3$, more preferably less than about 0.88 g/cm$^3$, most preferably less than about 0.875 g/cm$^3$ The first component will also have a melt index ($I_2$) of less than about 20, more preferably less than about 15, and most preferably less than about 12.

In the case the first component comprises a propylene-based polymer, it should have at most 89 mol percent propylene, preferably at most 85 mol percent propylene. In one embodiment of the invention, the remaining copolymer is comprised of ethylene polymerized using metallocene or non-metallocene catalysts. The polymers in this invention are not method specific and can be made using gas phase, solution, or slurry processes. The first component will also have a MFR of less than about 50, more preferably less than about 25, and most preferably less than about 10.

The first component of the present invention may also include blocked or multi-blocked polymers, as described for example, in WO 2005/090427, WO 2005/090426 and WO 2005/090425, each claiming priority to U.S. Ser. No. 60/553,906 filed Mar. 17, 2004, the disclosures of each of which is incorporated herein by reference. Multi-blocked ethylene based polymers and interpolymers (including, for example, ethylene/C3-C20 alpha-olefin interpolymers) are especially preferred.

As understood by one skilled in the art, in general, the lower the density of the first component, the more elastic the polymer will be. The first component can be made using a gas, slurry or solution phase reactors. Likewise, it may be heterogeneous (for example, as prepared by chrome or Ziegler-Natta catalysts) or homogeneous (for example, as prepared by single site or metallocene catalysts) or of intermediate composition distribution. Possible configurations by which the first polymer component can be made include using one reactor or multiple reactors arranged in series or parallel or combinations thereof.

Although polymers that have varied molecular weight distributions are suitable for use with this invention, narrower molecular weight distributions are preferred such as those made using metallocene catalysts to minimize effects of draw resonance.

The first component may comprise from 85 to 99 percent of the total composition with greater than 88 percent or even greater than 90 percent being more preferred.

The second component is a high pressure low density type resin Possible materials for use as the second component include LDPE (homopolymer); ethylene copolymerized with one or more α-olefins, for example, propylene or butene; and ethylene copolymerized with at least one α,β-ethylenically unsaturated comonomer, for example, acrylic acid, methacrylic acid, methyl acrylate and vinyl acetate; branched polypropylene and blends thereof. A suitable technique for preparing useful high pressure ethylene copolymer compositions is described by McKinney et al. in U.S. Pat. No. 4,599,392, the disclosure of which is incorporated herein by reference.

LDPE (homopolymer) is generally the most preferred material for use as the second component with an ethylene-based first component, however, if the first component includes propylene (for example, if the first component is a propylene/ethylene copolymer) then it may be advantageous for the second component to also include propylene as a comonomer. Though not limited by theory, it is hypothesized that inclusion of propylene in the second component is thought to increase compatibility and miscibility if the first component also comprises propylene. Likewise, the theory of increased compatibility through increased miscibility of like components is thought to explain the preference of ethylene-based elastomers to be used with ethylene based species with high levels of long chain branching.

When propylene based polymers are desired for use as the second component, the preferred materials are the branched polypropylene materials (both homopolymer and copolymer) of the type disclosed in WO2003/082971. The Coupled Impact Polypropylene Polymers disclosed in that reference are particularly preferred propylene-based materials. Such polymers and their manufacture are disclosed in U.S. Pat. No. 6,359,073, and in WO 2000/78858, which are hereby incorporated by reference in their entirety.

The preferred high pressure low density polyethylene material (LDPE) has a melt index MI ($I_2$) of less than about 20, more preferably less than about 5, most preferably less than 1, and greater than about 0.2, more preferably greater than about 0.25, most preferably more than 0.3 g/10 min. The preferred LDPE will have a density between 0.915 g/cm$^3$ and 0.930 g/cm$^3$, with less than 0.920 g/cm$^3$ being more preferred.

The second component will ideally be added in an amount such that it makes up at least about 1 percent, more preferably at least about 5 percent, and most preferably about 6 percent by weight of the final composition. Preferably, the second component will not comprise more than 12 percent, preferably not more than 10, still more preferably not more than about 8 percent and most preferably between 4 and 7 percent by weight of the final composition. It should be understood that the total amount of the first and second components does not necessarily have to equal 100 percent as other materials may be present.

In yet another embodiment of this invention, a third polymer component may be used to improve compatibility, miscibility, dispersion, or other characteristics among the polymer components as is generally known in the art.

The second component may be made in any autoclave or tubular reactors capable of running at pressures above 14,500 psi (100 MPa) with the use of free-radical initiators, such as peroxides, but it is preferred that this component be made in an autoclave reactor (optionally configured with a series tube reactor) with chilled ethylene feed below 35° C. operating in single phase mode with three or more zones. The reactor is preferably run above the transition point (phase boundary between a two-phase and a single-phase system) at an average reactor temperature of approximately 240° C.

The composition of the present invention may also include LDPE/LDPE blends where one of the LDPE resins has a relatively higher melt index and the other has a lower melt index and is more highly branched. The component with the higher melt index can be obtained from a tubular reactor, and a lower MI, higher branched, component of the blend may be added in a separate extrusion step or using a parallel tubular/autoclave reactor in combination with special methods to control the melt index of each reactor, such as recovery of telomer in the recycle stream or adding fresh ethylene to the autoclave (AC) reactor, or any other methods known in the art.

For additional attributes, any of the polymer components may be functionalized or modified at any stage. Examples include but are not limited to grafting, crosslinking, or other methods of functionalization.

Preparation of the Blends

The preferred blends for making the polymer extrusion compositions of this invention can be prepared by any suitable means known in the art including tumble dry-blending, weigh feeding, solvent blending, melt blending via compound or side-arm extrusion, or the like as well as combinations thereof.

The compositions of the present invention can also be blended with other polymer materials, such as polypropylene and ethylene-styrene interpolymers. The other polymer materials can be blended with the inventive composition to modify processing, film strength, heat seal, or adhesion characteristics as is generally known in the art.

Both of the required components of the blends of the current invention can be used in a chemically and/or physically modified form to prepare the inventive composition. Such modifications can be accomplished by any known technique such as, for example, by ionomerization and extrusion grafting.

Additives such as antioxidants (for example, hindered phenolics such as Irganox® 1010 or Irganox® 1076 supplied by Ciba Geigy), phosphites (for example, Irgafos® 168 also supplied by Ciba Geigy), cling additives (for example, PIB), Standostab PEPQ™ (supplied by Sandoz), pigments, colorants, fillers, and the like can also be included in the ethylene polymer extrusion composition of the present invention, to the extent that they do not interfere with the reduced draw resonance discovered by Applicants. The article made from or using the inventive composition may also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives may also be added to enhance the anti-fogging characteristics of, for example, transparent cast films, as described, for example, by Niemann in U.S. Pat. No. 4,486,552, the disclosure of which is incorporated herein by reference. Still other additives, such as quaternary ammonium compounds alone or in combination with ethylene-acrylic acid (EAA) copolymers or other functional polymers, may also be added to enhance the anti-static characteristics of coatings, profiles and films of this invention and allow, for example, the packaging or making of electronically sensitive goods. Other functional polymers such as maleic anhydride grafted polyethylene may also be added to enhance adhesion, especially to polar substrates.

Alternatively, the polymeric and non-polymeric components may be combined with steps that include solution blending (also known as solvent blending) or a combination of melt and solution methods. Solution blending methods include but are not limited to multiple reactors in series, parallel, or combinations thereof. As solution methods can sometimes result in better dispersion of the components, greater efficacy of the second component is anticipated. Benefits may include using less second component to achieve comparable improvements in resistance to draw resonance with maintenance of greater elastic properties such as reduced set strain and less hysteresis.

Multilayered constructions comprising the inventive composition can be prepared by any means known including coextrusion, laminations and the like and combinations thereof. When the inventive composition is used in multilayered constructions, substrates or adjacent material layers can be polar or nonpolar including for example, but not limited to, paper products, metals, ceramics, glass and various polymers, particularly other polyolefins, and combinations thereof. If a polymer substrate is used, it may take a variety of forms including but not limited to webs, foams, fabrics, nonwovens, films etc.

Test Procedures

Molecular Architecture Determination

In order to determine the molecular architecture of various polymer compositions, the following procedure is used:

The chromatographic system consists of a Waters (Millford, Mass.) 150° C. high temperature chromatograph equipped with a Precision Detectors (Amherst, Mass.) 2-angle laser light scattering detector Model 2040. The 15-degree angle of the light scattering detector is used for calculation purposes. Data collection is performed using Viscotek TriSEC software version 3 and a 4-channel Viscotek Data Manager DM400. The system is equipped with an on-line solvent degas device from Polymer Laboratories.

The carousel compartment was operated at 140° C. and the column compartment is operated at 150° C. The columns used are 4 Shodex HT 806M 30 cm 13-micron columns and 1 Shodex HT803 15 cm 13-micron column. The solvent used is 1,2,4 trichlorobenzene. The samples are prepared at a concentration of 0.1 grams of polymer in 50 milliliters of solvent. The chromatographic solvent and the sample preparation solvent contain 200 ppm of butylated hydroxytoluene (BHT). Both solvent sources are nitrogen sparged. Polyethylene samples are stirred gently at 160 degrees Celsius for 4 hours. The injection volume used is 200 microliters and the flow rate is 0.67 milliliters/minute.

Calibration of the GPC column set is performed with 21 narrow molecular weight distribution polystyrene standards with molecular weights ranging from 580 to 8,400,000 and are arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)).:

$$M = A \times (M_{polystyrene})^B$$

where M is the molecular weight, A has a value of 0.41 and B is equal to 1.0.

A fourth order polynomial is used to fit the respective polyethylene-equivalent calibration points. Deviation between the polynomial fit and the calibration points is minimized.

The total plate count of the GPC column set is performed with Eicosane (prepared at 0.04 g in 50 milliliters of TCB and dissolves for 20 minutes with gentle agitation.) The plate count and symmetry are measured on a 200 microliter injection according to the following equations:

$$\text{PlateCount} = 5.54 \times (\text{RV at peak Maximum}/(\text{Peak width at half height}))^2$$

Where RV is the retention volume in milliliters and the peak width is in milliliters.

$$\text{Symmetry} = (\text{Rear peak width at one tenth height} - \text{RV at Peak maximum})/(\text{RV at Peak Maximum} - \text{Front peak width at one tenth height})$$

where RV is the retention volume in milliliters and the peak width is in milliliters.

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software. The molecular weight data for off-set determination is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight is obtained from the sample refractive index area and the refractive index detector calibration from a linear polyethylene homopolymer of 115,000 molecular weight. The chromatographic concentrations are assumed low enough to eliminate addressing 2nd Virial coefficient effects (concentration effects on molecular weight).

In order to monitor the deviations over time, which may contain an elution component (caused by chromatographic changes) and a flow rate component (caused by pump changes), a late eluting narrow peak is generally used as a "marker peak". A flow rate marker is therefore established based on the air peak mismatch between the degassed chromatographic system solvent and the elution sample on one of the polystyrene cocktail mixtures. This flow rate marker is used to linearly correct the flow rate for all samples by alignment of the air peaks. Any changes in the time of the marker peak are then assumed to be related to a linear shift in both flow rate and chromatographic slope.

To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (as a measurement of the calibration slope) is calculated as Equation 1. In a high-temperature SEC system, an antioxidant mismatch peak or an air peak (if the mobile phase is sufficiently degassed) can be used as an effective flow marker. The primary features of an effective flow rate marker are as follows: the flow marker should be mono-dispersed. The flow marker should elute close to the total column permeation volume. The flow marker should not interfere with the chromatographic integration window of the sample.

Flowrate$_{effective}$=Flowrate$_{nominal}$×FlowMarker$_{Calibtion}$/Flowmarker$_{Observed}$ The preferred column set is of 13 micron particle size and "mixed" porosity to adequately separate the highest molecular weight fractions appropriate to the claims.

The verification of adequate column separation and appropriate shear rate can be made by viewing the low angle (less than 20 degrees) of the on-line light scattering detector on an NBS 1476 high pressure low density polyethylene standard. The appropriate light scattering chromatogram should appear bimodal (very high MW peak and moderate molecular weight peak) as shown in the FIG. 5. There should be adequate separation by demonstrating a trough height between the two peaks less than half of the total LS peak height. The plate count for the chromatographic system (based on cicosane as discussed previously) should be greater than 32,000 and symmetry should be between 1.00 and 1.12. The CDF(LS) fraction of NBS 1476 greater than 1,150,000 molecular weight is calculated as approximately 0.11. It should be noted that 1,150,000 occurs at approximately the LALLS high molecular weight peak position (see FIG. 5).

The calculation of the cumulative detector fractions (CDF) for the refractometer ("CDF RI") and the low angle laser light scattering detector ("CDF LS") are accomplished by the following steps:

1) Linearly flow correct the chromatogram based on the relative retention volume ratio of the air peak between the sample and that of a consistent narrow standards cocktail mixture.

2) Correct the light scattering detector offset relative to the refractometer as described in the calibration section.

3) Subtract baselines from the light scattering and refractometer chromatograms and set integration windows making certain to integrate all of the low molecular weight retention volume range in the light scattering chromatogram that is observable from the refractometer chromatogram.

4) Calculate the molecular weights at each data slice based on the polystyrene calibration curve, modified by the polystyrene to polyethylene conversion factor (0.41) as described in the calibration section.

5) Calculate the cumulative detector fraction (CDF) of the LALLS chromatogram (CDFLS) based on its baseline-subtracted peak height (H) from high to low molecular weight (low to high retention volume) at each data slice (i) according to the following equation:

$$CDF_i = \frac{\sum_{j=LowestRVindex}^{i} H_j}{\sum_{j=LowestRVindex}^{HighestRVindex} H_j}$$

where i is between the LowestRVindex and the HighestRVindex

6) A plot of CDF versus molecular weight is obtained by calculating the CDF at each integrated data slice from step (5) and plotting it versus the log of the polyethylene equivalent molecular weight at each integrated data slice from step (4).

7) The range over which the "CDF" (cumulative detector fraction) is selected for this particular invention is from molecular weights greater than 1,150,000. CDF for NBS 1476 is about 0.11 for the molecular weight range greater than 1,150,000.

The ethylene based compositions of the present invention have a CDF for the molecular weights greater than 1,150,000 of greater than about 0.02, more preferably in the range of from greater than 0.03 to less than about 0.12, and still more preferably in the range of from greater than about 0.04 to less than about 0.09.

Compression Molding

Compression molded films were prepared by weighing out the necessary amount of polymer to fill a 9 inch long by 6 inch wide by 0.1-0.5 millimeter mold. This polymer and the mold were lined with Mylar film and placed between chrome coated metal sheets and then the ensemble was placed into a PHI laminating press model PW-L425 (City of Industry, California) preheated to 190° C. for ethylene-based elastomers and to 210° C. for propylene-based elastomers. The polymer was allowed to melt for 5 minutes under minimal pressure. Then a force of 10000 pounds was applied for 5 minutes. Next, the force was increased to 20000 pounds and 1 minute was allowed to elapse. Afterwards, the ensemble was placed between 25° C. water-cooled platens and cooled for 5 minutes. The polymer sheet was then removed from the mold and allowed to age at ambient conditions (about 25° C.) for at least 24 hours before testing for ethylene-based elastomers and for at least 48 hours before testing for propylene-based elastomers. 6 inch long by 1 inch wide strips were cut from the compression molded film using a punch press.

Specimen Preparation for Mechanical Testing

Specimen (6 inches long and 1 inch wide) cut from compression molded films. For extruded film, the specimens were cut with the length parallel to the cross direction (CD). CD is defined as the direction perpendicular to extrusion. Specimens were extracted from areas of the film that were as uniformly thick as possible. Typically, the edges of the extruded film were avoided.

Elasticity

To qualify a material as elastomeric and thus suitable for the first component, a 1-cycle hysteresis test to 80 percent strain was used. For this test, the specimens were then loaded into a Sintech type mechanical testing device fitted with pneumatically activated line-contact grips with an initial separation of 4 inches. Then the sample was stretched to 80 percent strain at 500 mm/min, and returned to 0 percent strain at the same speed. The strain at 10 g load upon retraction was taken as the set. Upon immediate and subsequent extension, the onset of positive tensile force was taken as the set strain. The hysteresis loss is defined as the energy difference between the extension and retraction cycle. The load down was the retractive force at 50 percent strain. In all cases, the samples were measured green or unaged.

Strain is defined as the percent change in sample length divided by the original sample length (22.25 mm) equal to the original grip separation. Stress is defined as the force divided by the initial cross sectional area.

DSC Method

Differential scanning calorimetry (DSC) is a common technique that can be used to examine the melting and crystallization of semi-crystalline polymers. General principles of DSC measurements and applications of DSC to studying semi-crystalline polymers are described in standard texts (for example, E. A. Turi, ed., *Thermal Characterization of Polymeric Materials, Academic Press,* 1981).

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 101° C./min. The sample is kept isothermally at −30° C. for 2 minutes and heated to 60° C. at a heating rate of 10° C./min. The onset of melting is determined and checked to be within 0.5° C. from 0° C.

The polymer samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. This step is designated as the $2^{nd}$ heating. The resulting enthalpy curves are analyzed for peak melt temperature, onset and peak crystallization temperatures, total heat of fusion (also known as heat of melting) (ΔH), the heat of fusion (melting) above 80° C. ($\Delta H_{PA}(80°$ C.) or "PA"). The total heat of fusion was measured by integrating the area under the melting endotherm from the beginning of melting to the end of melting by using a linear baseline. The heat of fusion (melting) above 80° C. was defined as the partial area of the total heat of fusion above 80° C. This is typically measured by dropping a perpendicular at 80° C. using standard DSC software. FIG. 1 illustrates this calculation for Example 1-5.

For ethylene based system, the heat of melting of the composition is less than about 60 J/g, and the partial area above 80° C. for the composition is less than about 25 percent of the total heat of melting, preferably greater than about 4 percent and less than about 20 percent, more preferably greater than about 7 percent and less than about 17 percent of the total heat of melting.

For propylene based systems, the heat of melting of the composition is less than about 57 J/g; and the partial area above, 80° C. for the composition is less than about 65% of the total heat of melting, preferably greater than about 20 percent and less than about 60 percent of the total heat of melting.

DSC Method for Extruded Films

For extruded film, the equipment, calibration procedures, sample preparation, and data analysis were nearly the same as used for compression molded film. The difference was that extruded film was used. Calculation of heat of melting and partial area is the same as previously described.

Blending

Inventive and comparative blends used for compression molding (Table II) were also formulated by weighing out the dry blend components. They were then introduced to a Haake mixer preheated to 190° C. and set at 40 rpm rotor speed. After torque reached steady state (typically three to five minutes), the sample was then removed and allowed to cool. The blends were then molded in the same way as the individual resins.

100 Percent Cycle Test

For the 100 percent cycle test, an Instron 5564 (Canton, Mass.) equipped with pneumatic grips and fitted with a 20 pound tension load cell was used. After proper calibration of the load cell, the specimen is oriented parallel to the displacement direction of the crosshead and then gripped with a separation of 3 inches. The sample was stretched to 100 percent strain at a rate of 10 inches per minute. The crosshead direction was immediately reversed at then returned to the starting grip separation of 3 inches. The crosshead direction was again reversed such that the sample was then extended at the same speed until a positive tensile force was measured. The strain corresponding to the onset of positive tensile force was taken as the immediate set. Extension and retraction stress were measured at 30 percent strain.

Strain measured as a percentage is defined as the crosshead displacement divided by the original grip separation of three inches and then multiplied by 100. Stress is defined as force divided by the original cross sectional area. To measure film thickness, the weight of the sample is divided by its density and surface area (6 in$^2$ for the sample geometry used).

EXAMPLES

A description of all of the resins used in the Examples is presented in Table 1.

TABLE I

| | | | | | |
|---|---|---|---|---|---|
| | | Resins | | | |
| Resin | Comonomer | Density (g/cm$^3$) | MI (I$_2$) (g/10 min) | MWD | Process |
| A | — | 0.919 | 0.47 | 42.4 | autoclave LDPE |
| B | — | 0.918 | 0.7 | 6.7 | autoclave LDPE |

TABLE I-continued

Resins

| Resin | Comonomer | Density (g/cm³) | MI (I₂) (g/10 min) | MWD | Process |
|---|---|---|---|---|---|
| C | — | 0.917 | 2.5 | 33.1 | autoclave LDPE |
| D | 1-Octene | 0.870 | 5.0 | 2.4 | ethylene-octene elastomer |
| E | 1-Octene | 0.863 | 5.0 | 2.1 | ethylene-octene elastomer |
| F | 1-Octene | 0.864 | 13 | 1.9 | ethylene-octene elastomer |
| G | 1-Octene | 0.919 | 6 | 2.7 | ethylene-octene LLDPE |

A critical aspect necessary for describing draw resonance (DR) is two fixed points that anchor the molten web. The die serves as one of the anchors. The nip roll/chill roll serves as the second anchor on the web. The flow from the die to the nip roll is drawn down in planar extension. The draw down ratio (DDR) is a dimensionless number that describes the extension imparted to the film from the die to the chill roll. The DDR is shown in Equation-1.

$$DDR = Vf/Vo \qquad (1)$$

where:

$Vf = M/(h_0 \cdot W_f \cdot \rho_s)$ = Haul-off speed $Vo = M/(h_0 \cdot W_0 \cdot \rho_m)$ = Die Exit velocity M = Mass output rate $h_x$ = Film thickness at location x $W_x$ = Film width at location x $\rho_x$ = Polymer density at the temperature at location x The draw down ratio at which draw resonance starts will be called the critical draw down ratio ($DDR_c$). This can be determined by increasing the haul off speed until the onset of edge weave draw resonance. Draw resonance is described by periodic film thickness and/or web width variations.

For the examples in the present invention the following extrusion coating line was used to determine the $DDR_c$. A Black Clawson extrusion coating line equipped with 3.5 inch 30 L/D extruder driven by a 150 HP drive was used. The line has a 36 inch Cloeren die. The die is deckled to 24 inches. The air gap was set at 5.7-inches. Thus, the aspect ratio (A) (which is the ratio of air gap length to one half of the die width) was 0.475. The haul-off speed was capable of running as high as 2500 feet per minute. The die gap was set to 0.023 inches. For this study 40-lb Kraft paper was the substrate coated. The melt temperature was targeted for 420° F. (215° C.). The output rate was limited by amps on the screw drive motor to 60 rpm (200 lb/hr) when running with the 3.5-inch extruder.

Dry blends of the materials indicated in Tables II, III, IV were then prepared. These blends were then processed on the extrusion coater at 60 rpm screw speed (~190-200 lb/hr). Film samples were isolated during extrusion coating inserting pieces of Mylar film on top of the Kraft paper prior to coating with polymer. They were collected at approximately 1.8 mil film thickness for testing of elastic properties, then the haul-off speed was increased until draw resonance (DR) was encountered. The line speed was then reduced to get out of DR, and increased up to just before DR was observed. The process conditions were recorded and the $DDR_c$ calculated. The $DDR_c$ for each blend is reported in Table II, III, IV. Later, the polymer film was removed from the mylar film for testing.

TABLE II

D/A Formulations

| | Example | | | | | |
|---|---|---|---|---|---|---|
| | 1-1 | 1-2 | 1-3 | 1-4 | 1-5 | 1-6 |
| First Component: | 98% D | 90% D | 90% D | 88% D | 94% D | 92% D |
| Second Component: | 2% A | 10% A | 10% A | 12% A | 6% A | 8% A |
| Output, lb/hr | 197 | 195 | 194 | 195 | 191 | 190 |
| Melt Temp F. | 421 | 421 | 424 | 423 | 424 | 424 |
| Film Thickness, mil | 1.605 | 1.34 | 1.4 | 1.52 | 1.11 | 0.97 |
| Air gap, in | 5.7 | 5.7 | 5.7 | 5.7 | 6 | 5.7 |
| DDRc | 17.055 | 19.317 | 17.981 | 16.567 | 23.630 | 26.55 |
| Haul-off speed, fpm | 313 | 351 | 325 | 301 | 420 | 470 |
| Neck-in, in | 3.310 | 2.810 | 2.560 | 2.560 | 2.940 | 2.81 |
| Aspect Ratio | 0.475 | 0.475 | 0.475 | 0.475 | 0.500 | 0.475 |
| Web Width, in | 17.38 | 18.38 | 18.88 | 18.88 | 18.12 | 18.38 |

TABLE III

D/B Formulations

| | Example | | | | | |
|---|---|---|---|---|---|---|
| | 2-1 | 2-2 | 2-3 | 2-4 | 2-5 | 2-6 |
| First Component: | 100% D | 98% D | 96% D | 94% D | 92% D | 90% D |
| Second Component: | 0% B | 2% B | 4% B | 6% B | 8% B | 10% B |
| Output, lb/hr | 193 | 197 | 195 | 196 | 195 | 195 |
| Melt Temp F. | 424 | 421 | 421 | 421 | 421 | 421 |
| Film Thickness, mil | 1.64 | 1.61 | 1.42 | 1.31 | 1.22 | 1.34 |
| Air gap, in | 5.7 | 5.7 | 5.7 | 5.7 | 5.7 | 5.7 |
| DDRc | 16.69 | 17.06 | 19.15 | 20.25 | 21.52 | 19.32 |
| Haul-off speed, fpm | 300 | 313 | 347 | 369 | 391 | 351 |
| Aspect Ratio | 0.475 | 0.475 | 0.475 | 0.475 | 0.475 | 0.475 |
| Neck-in, in | 3.3125 | 3.31 | 3.25 | 3 | 2.94 | 2.81 |
| Web Width, in | 17.375 | 17.38 | 17.5 | 18 | 18.12 | 18.38 |

TABLE IV

D/C Formulations

| | Example | | | | | |
|---|---|---|---|---|---|---|
| | 3-1 | 3-2 | 3-3 | 3-4 | 3-5 | 3-6 |
| First Component: | 100% D | 98% D | 96% D | 94% D | 92% D | 90% D |
| Second Component: | 0% C | 2% C | 4% C | 6% C | 8% C | 10% C |
| Output, lb/hr | 193 | 194 | 197 | 195 | 193 | 193 |
| Melt Temp F. | 424 | 425 | 425 | 425 | 420 | 423 |

TABLE IV-continued

D/C Formulations

| | Example | | | | | |
|---|---|---|---|---|---|---|
| | 3-1 | 3-2 | 3-3 | 3-4 | 3-5 | 3-6 |
| Film Thickness, mil | 1.64 | 1.40 | 1.30 | 1.23 | 1.39 | 1.25 |
| Air gap, in | 5.7 | 5.7 | 5.7 | 5.7 | 6 | 5.7 |
| DDRc | 16.69 | 19.39 | 20.96 | 22.01 | 18.35 | 20.85 |
| Haul-off speed, fpm | 300 | 351 | 385 | 400 | 329 | 375 |
| Aspect Ratio | 0.475 | 0.475 | 0.475 | 0.475 | 0.5000 | 0.475 |
| Neck-in, in | 3.3125 | 3.25 | 3.25 | 3.19 | 2.67 | 2.88 |
| Web Width, in | 17.375 | 17.5 | 17.5 | 17.62 | 18.66 | 18.24 |

A plot of $DDR_c$ vs. percent second component was prepared for Examples 1-1 to 1-5 and. This plot appears as FIG. 3. From this plot, it can clearly be seen that the $DDR_c$ experiences a maximum at about 6 percent of component A, at which level the $DDR_c$ is about 25 percent higher than observed with pure component D. Though not limited by theory, it is thought that the initial increase in $DDR_c$ originates from increased melt strength due to partial solubility of branched species within the draw-resonance prone component and the subsequent decrease in $DDR_c$ originates from significant phase separation.

Mechanical Properties

The extrusion coated film samples were then evaluated for elastic properties. Six inch long and one inch wide strips of the films were cut in the CD. For compression molded film samples, direction was not specific. The precise thickness for the films was calculated by dividing the weight of the film (as determined using a microbalance) by density and area. An Instron 5564 testing frame was then used to determine extension and retractive forces as well as set. Specimens were gripped with either pneumatic or roller grips. The spacing between grips taken as the gauge length was 3 inches. Crosshead speed was set at 10 inches per minute. Hysteresis behavior was measured in three steps:

1. The crosshead was displaced to provide a strain of 100 percent.
2. The crosshead was then returned to 0 percent strain.
3. The crosshead was then increased again until a positive tensile load was measured.

This test was performed for selected compression molded ("comp") and extrusion coated ("ext") samples (Table V). Extension and retraction forces were measured at 30 percent strain of extension and retraction during the first cycle. The onset of positive load in the third cycle was taken as the immediate set strain. Stress was calculated in the megapascals (MPa).

TABLE V

Mechanical Properties

| Ex. | Method | Composition | Description | Stress at 30% load MPa | stdv | Stress at 30% unload MPa | stdv | Retained Load at 30% % | uncert | Immediate Set % | stdv |
|---|---|---|---|---|---|---|---|---|---|---|---|
| C2 | comp | | D | 1.95 | 0.08 | 0.51 | 0.03 | 26 | 2 | 11.4 | 0.6 |
| C3 | comp | | C | 0.89 | 0.04 | 0.45 | 0.02 | 51 | 4 | 8.5 | 0.8 |
| C5 | comp | | C | 7.9 | 0.3 | 0.00 | 0.00 | 0 | — | 35 | 5 |
| C6 | comp | | A | 8.7 | 0.1 | 0.00 | 0.00 | 0 | — | 27 | 4 |
| 2/1 | comp | 97/3 | D/A | 1.93 | 0.04 | 0.54 | 0.05 | 28 | 3 | 11.4 | 0.8 |
| 2/2 | comp | 94/6 | D/A | 2.07 | 0.01 | 0.54 | 0.05 | 26 | 2 | 10.8 | 0.7 |
| 2/3 | comp | 91/9 | D/A | 2.19 | 0.02 | 0.48 | 0.01 | 22 | 1 | 11.1 | 0.2 |
| 3/1 | comp | 97/3 | C/C | 1.23 | 0.02 | 0.52 | 0.02 | 42 | 1 | 10 | 0 |
| 3/2 | comp | 94/6 | C/C | 1.29 | 0.05 | 0.51 | 0.03 | 40 | 2 | 10.03 | 0.06 |
| 3/3 | comp | 91/9 | C/C | 1.37 | 0.01 | 0.51 | 0.01 | 37 | 1 | 10.3 | 0.3 |
| 4/1 | comp | 94/6 | C/A | 1.28 | 0.03 | 0.5 | 0.02 | 39 | 1 | 10 | 0.1 |
| 4/2 | comp | 80/20 | C/A | 1.82 | 0.05 | 0.51 | 0.01 | 28 | 1 | 10.9 | 0.3 |
| 4/3 | comp | 50/50 | C/A | 3.4 | 0.01 | 0.28 | 0.01 | 8.2 | 0.2 | 15.9 | 0.2 |
| 4/4 | comp | 30/70 | C/A | 5.2 | 0.1 | 0 | 0 | 0 | — | 24.2 | 0.3 |
| 6/1 | ext | 92/8 | D/A | 2.5 | 0.4 | 0.5 | 0.1 | 18 | 6 | 12 | 2 |
| 4-1 | ext | 94/6 | E/C | 1.45 | 0.04 | 0.64 | 0.01 | 44 | 2 | 8.2 | 0.3 |
| 3-3 | ext | 96/4 | D/C | 1.48 | 0.05 | 0.58 | 0.02 | 39 | 2 | 8.2 | 0.5 | comp - denotes compression molded
ext - denotes extrusion coated

Figure 4:
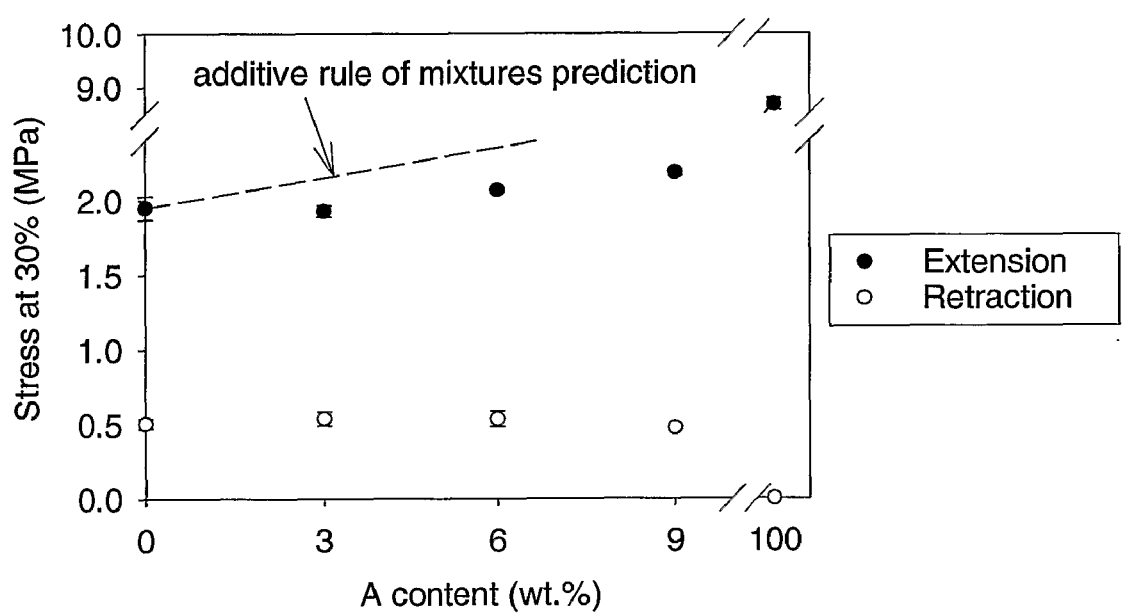
FIG. 4 is a plot of extension and retraction stress of A/D blends

Extension and retraction stresses are plotted for 2/1, 2/2, 2/3 blends and corresponding controls in FIG. 4. The data show no significant degradation in retraction stress. Retraction force is necessary in many applications as it provides the "holding power" in elastic applications. For example, diaper tabs require a certain level of retractive force to hold the diaper chassis in place. No decrease in retractive stress means that addition of the second component will not affect the necessary film gauge. Extension stress increases, however it is lower than predicted by additive rule of mixtures. Lower extension stress is often desirable as it means that the film of a given thickness will be easy to stretch.

DSC and CDF analysis was performed according to the previous descriptions. Table VI summarizes the results for the inventive examples (number designation in example column) and comparative examples (C designation in example column).

enjoy the benefits of the maintained retraction force. The mechanical benefits described above are accompanied by the increase in critical draw down ratio described in equation 4 resulting higher line-speeds. Overall, despite addition of a nonelastic component, the resulting formulation has shown remarkably little degradation in elastic properties. These benefits are accompanied by improvements in line-speed. The synergistic combination therefore provides the mechanical properties desired together with improved processibility by increased resistance to draw resonance.

We claim:
1. A composition comprising:
   a. about 88 to about 99 percent by weight of the composition of a linear and/or substantially linear ethylene/alpha olefin copolymer plastomer and/or elastomer having a density of less than about 0.885 g/cm$^3$ and a melt index ($I_2$) of less than about 20 g/10 min; and

TABLE VI

DSC and CDF Analysis

| Example | Description | 1st/2nd Composition | 1st Comp | 2nd Comp | CDF | ΔH (J/g) | PA (T > 80° C.) (J/g) | PA/ΔH (%) |
|---|---|---|---|---|---|---|---|---|
| C1 | comp | 100/0 | F | — | 0 | 39.4 | 0.1 | 0.1 |
| C2 | comp | 100/0 | D | — | 0 | 42.5 | 0.3 | 0.8 |
| C3 | comp | 100/0 | E | — | 0 | 35.2 | 0.0 | 0.0 |
| C4 | comp | 100/0 | G | — | 0.044 | — | — | — |
| C5 | comp | 100/0 | — | C | 0.305 | 125.9 | 85.2 | 67.6 |
| C6 | comp | 100/0 | — | A | 0.383 | 125.1 | 87.5 | 69.9 |
| 1/1 | comp | 97/3 | F | A | 0.071 | 43.6 | 9.2 | 21.1 |
| 1/2 | comp | 94/6 | F | A | 0.130 | 41.3 | 6.1 | 14.9 |
| 1/3 | comp | 91/9 | F | A | 0.167 | 44.1 | 9.2 | 20.8 |
| 2/1 | comp | 97/3 | D | A | 0.070 | 46.7 | 4.5 | 9.6 |
| 2/2 | comp | 94/6 | D | A | 0.112 | 52.8 | 7.6 | 14.4 |
| 2/3 | comp | 91/9 | D | A | 0.150 | 55.8 | 10.9 | 19.6 |
| 3/1 | comp | 97/3 | E | C | 0.034 | 37.7 | 3.2 | 8.6 |
| 3/2 | comp | 94/6 | E | C | 0.062 | 39.9 | 5.8 | 14.6 |
| 3/3 | comp | 91/9 | E | C | 0.089 | 44.3 | 9.1 | 20.5 |
| 4/1 | comp | 94/6 | E | A | — | 41.0 | 3.4 | 8.2 |
| 4/2 | comp | 80/20 | E | A | 0.224 | 56.0 | 19.6 | 35.0 |
| 4/3 | comp | 50/50 | E | A | 0.319 | 84.4 | 47.7 | 56.5 |
| 4/4 | comp | 30/70 | E | A | 0.348 | 104.9 | 65.8 | 62.7 |
| 5/1 | comp | 94/6 | G | A | 0.16 | — | — | — |
| 5/2 | comp | 91/9 | G | A | — | — | — | — |
| 5/3 | comp | 80/20 | G | A | 0.265 | — | — | — |
| 5/4 | comp | 50/50 | G | A | 0.336 | — | — | — |
| 5/5 | comp | 30/70 | G | A | 0.354 | — | — | — |
| 1-6 | ext | 92/8 | D | A | 0.148 | — | — | — |
| 1-5 | ext | 94/6 | D | A | | 53.8 | 8.7 | 16.2 |
| 4-1 | ext | 94/6 | E | C | 0.073 | 40.9 | 7.2 | 17.6 |
| 4-2 | ext | 94/6 | E | A | — | 36.8 | 6.7 | 18.2 |
| 3-3 | ext | 96/4 | D | C | 0.13 | 50.7 | 7.3 | 14.4 |
| C7 | ext | 100/0 | — | C | 0.305 | 125.9 | 85.2 | 67.6 |
| C8 | ext | 100/0 | E | — | 0 | 35.2 | 0.0 | 0.0 | comp - denotes compression molded
ext - denotes extrusion coated

Summary

Figure 3:
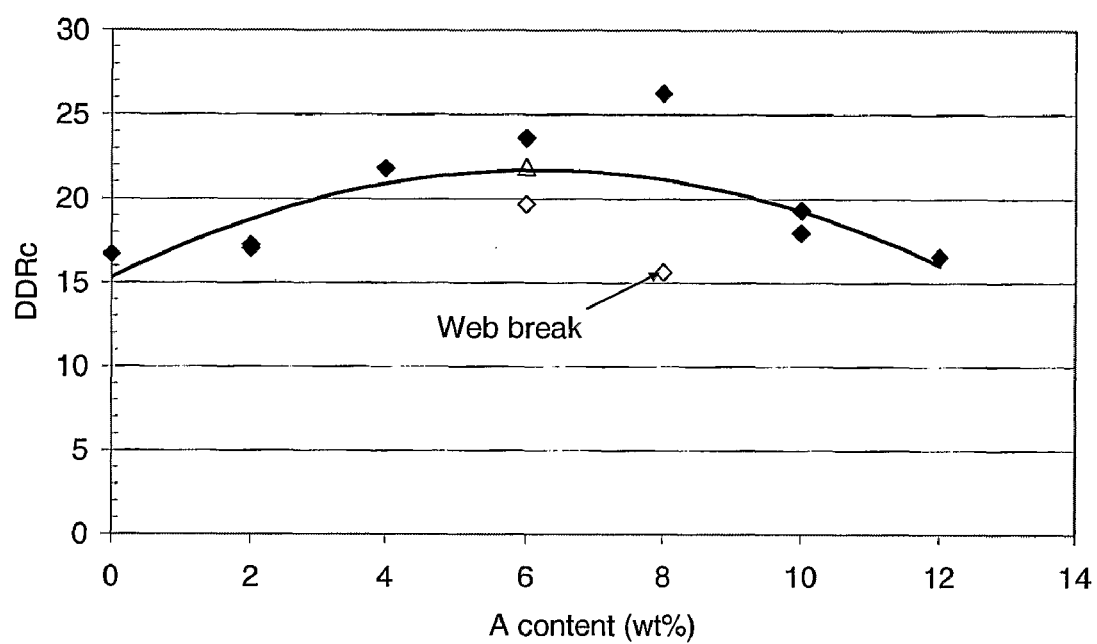
FIG. 3 is a plot of critical draw down ratio (DDRc) as a function of first component content in A/D blends at an aspect ratio of 0.475 and a melt temperature of 424° F.

FIG. 3 demonstrates the critical draw down ratio and FIG. 4 shows the extension and retraction forces of the film as a function of increasing content of the high pressure low density type resin. The line in FIG. 4 indicated by the arrow represents the expected result if the extension force behaved as predicted by the additive rule of mixtures. As can be seen from this figure, the actual measured extension force is below the line throughout the range claimed in this invention. As a result, the inventive blend is shown to remain softer (easier to stretch) than expected despite addition of a higher crystalline, higher modulus component. Also, retraction forces remain approximately constant. End use of these formulations would b. from about 1 to about 12 percent by weight of the composition of a high pressure low density resin wherein the heat of melting of the composition (measured by integrating the area under the melting endotherm of a differential scanning calorimetry (DSC) curve from the beginning of melting to the end of melting by using a linear baseline) is less than about 60 J/g; and wherein the partial area above 80° C. for the composition is less than about 25% of the total heat of melting; and wherein the cumulative detector fraction (CDF) for the composition having molecular weights greater than 1,150,000 is in a range of from greater than about 0.02 to about 0.167, where the CDF of the LALLS chromatogram (CDFLS) is calculated based on its baseline-subtracted peak height (H) from high to low molecular weight (low to high retention volume (RV)) at each data slice (i) according to the following equation:

$$CDF_i = \frac{\sum_{j=LowestRVindex}^{i} H_j}{\sum_{j=LowestRVindex}^{HighestRVindex} H_j}$$

where i is between the LowestRVindex and the HighestRVindex.

2. The composition of claim 1 wherein the first component is selected from the group comprising copolymers of ethylene with at least one other alpha olefin ($C_3$-$C_{22}$).

3. The composition of claim 1 wherein first component has a density of less than about 0.88 g/cm$^3$.

4. The composition of claim 1 wherein first component has a density of less than about 0.875 g/cm$^3$.

5. The composition of claim 1 wherein first component has a melt index ($I_2$) of less than about 15 g/10 min.

6. The composition of claim 1 wherein first component has a melt index ($I_2$) of less than about 12 g/10 min.

7. The composition of claim 1 wherein the partial area above 80° C. is greater than about 4 percent and less than about 20 percent of the total heat of melting.

8. The composition of claim 1 wherein the partial area above 80° C. is greater than about 7 percent and less than about 17 percent of the total heat of melting.

9. The composition of claim 1 wherein the CDF is greater than about 0.03 and less than about 0.12.

10. The composition of claim 1 wherein the CDF is greater than about 0.04 and less than about 0.09.

* * * * *